United States Patent [19]

Blair

[11] 4,127,299
[45] Nov. 28, 1978

[54] EXPANDING CAMPER ARRANGEMENT

[76] Inventor: Calvin B. Blair, P.O. Box 97, Barnard, Kans. 67418

[21] Appl. No.: 694,197

[22] Filed: Jun. 9, 1976

[51] Int. Cl.² ............................................. B60P 3/32
[52] U.S. Cl. .............................................. 296/23 MC
[58] Field of Search .............. 296/23 R, 23 MC, 23 B

[56] References Cited

U.S. PATENT DOCUMENTS

| | | | |
|---|---|---|---|
| 3,574,388 | 4/1971 | Stone | 296/23 MC |
| 3,719,383 | 3/1973 | Ferro | 296/23 MC |
| 3,719,384 | 3/1973 | du Bois | 296/23 MC |
| 3,801,135 | 4/1974 | Winter | 296/23 MC |
| 3,937,516 | 2/1976 | Chapman | 296/23 MC |

Primary Examiner—Philip Goodman
Attorney, Agent, or Firm—Fishburn, Gold & Litman

[57] ABSTRACT

A mobile camper arrangement is disclosed wherein two camper bodies of different shapes are mounted on the same towable trailer. One of the bodies is shaped to fit into outer recesses of the other body in order to effect maximum utilization of space on the trailer. Accordingly, a second camper body can be shaped to fit together with one that was previously purchased and which was specially shaped to fit snugly into the walled bed of a pickup truck. A useful combination is thus provided whereby the previously purchased camper body for a pickup truck does not have to lie unused or be disposed of when a larger mobile camper is needed.

11 Claims, 6 Drawing Figures

EXPANDING CAMPER ARRANGEMENT

BACKGROUND OF THE INVENTION

The present invention pertains to mobile campers, and more particularly pertains to a towable camping trailer having two modular camper bodies thereon which fit together when placed end-to-end, one being shaped to fit the other.

In recent years, great numbers of mobile camper vehicles have been sold, ranging in type from motorized varieties which have a power train and a camper body on the same frame, camper bodies mounted on a frame that can be towed by a truck or a car, and modular camper bodies designed to fit in the cargo hauling space of a pickup truck.

The last-mentioned type has proven to be very popular since the prefabricated modules are relatively low in cost while providing the advantage of allowing detachment of the camper body for the pickup truck when, absent of the camper body, it is needed for work, transportation, or other purposes. Nonetheless, such truck-mounted camper bodies have a relatively small amount of interior space, and appreciable time and work are required both for putting one on a truck and taking it off. Remodeling of the camper body to provide more space would be difficult and expensive, and the usual practice heretofore was to dispose of it or let it lie unused when a newer and larger camper was purchased. An additional disadvantage is that the weight of such camper bodies, along with that of equipment, supplies, etc., carried on the same truck, frequently results in a load which is greater than the suspension and axle at the rear end of the truck are designed to accommodate.

One object of the present invention is, therefore, to provide a camper arrangement whereby a modular camper body designed to be carried on a pickup truck can be utilized while nonetheless overcoming the previously stated disadvantages associated therewith.

Another object is to provide a specially shaped camper body which can be placed on a trailer along with another camper body designed to fit on a pickup truck, and thereby provide a mobile camping trailer having greater utilizable enclosed spaced thereon than can be realized from use only of the camper body designed to fit on a pickup truck.

Still another object is to provide a towable camping trailer having two separate bodies thereon, and wherein one of the bodies has outwardly projecting compartments which fit into recesses on the outside of the other body when both are placed on the trailer end-to-end.

Yet another object is to provide a towable camping trailer having a camper body mounted thereon which is shaped to fit on a pickup truck, and whereby the camper body does not have to be removed from the bed of the truck when it is desirable to use the truck separately of the camper body.

Even another object is to provide a camper which can be towed by a pickup truck while all or most of the cargo space of the truck is utilizable for hauling camping equipment and supplies therein.

Another object is to provide a mobile camper in the form of a trailer having a camper bodies thereon whereby the weight load on the rear axle of the truck does not exceed the specified load limit therefor.

Still another object is to provide a camping trailer whereby the owner of a previously purchased camper body designed to be carried on a pickup truck can continue to utilize the camper body while at the same time acquiring a towable camping trailer having an increased amount of enclosed, utilizable space thereon.

These and other objects and advantages of the present invention will become apparent from the following description and the appended claims.

SUMMARY OF THE INVENTION

In accordance with the present invention, a modular camper body comprises at least one compartment shaped to fit into a recess on the outside of a second camper body. The two bodies can be mounted next to each other on a trailer which comprises a main frame having a towing hitch at the front end, and to which wheels are mounted and located toward the sides thereof, thereby providing a towable camping trailer having two modular camping bodies thereon, one of which overlaps the other.

In some embodiments, the presently disclosed modular camping body can comprise a forward compartment and at least one other recess-filling compartment, advantageously two, each of which extends rearwardly from the forward compartment and has height and width dimensions that are less than those of the forward compartment.

In other embodiments, the presently disclosed modular camping body can comprise a sectionalized forward compartment and/or one or more of the aforesaid rearwardly extending recess-filling compartments. Sectionalization of the forward compartment is with respect to the utilizable space therein, and there can be first and second sections arranged so that the first section is located forwardly of the second section and is provided with a higher upper elevational limit of utilizable space than the second section. Advantageously, the two sections can be arranged so that each is accessable from the other. Where preferred, the forward compartment can also have a third section located forwardly of the first section, with the third section being accessable from the first section, and vice versa.

DESCRIPTION OF PREFERRED AND ALTERNATIVE EMBODIMENTS

Figure 1:
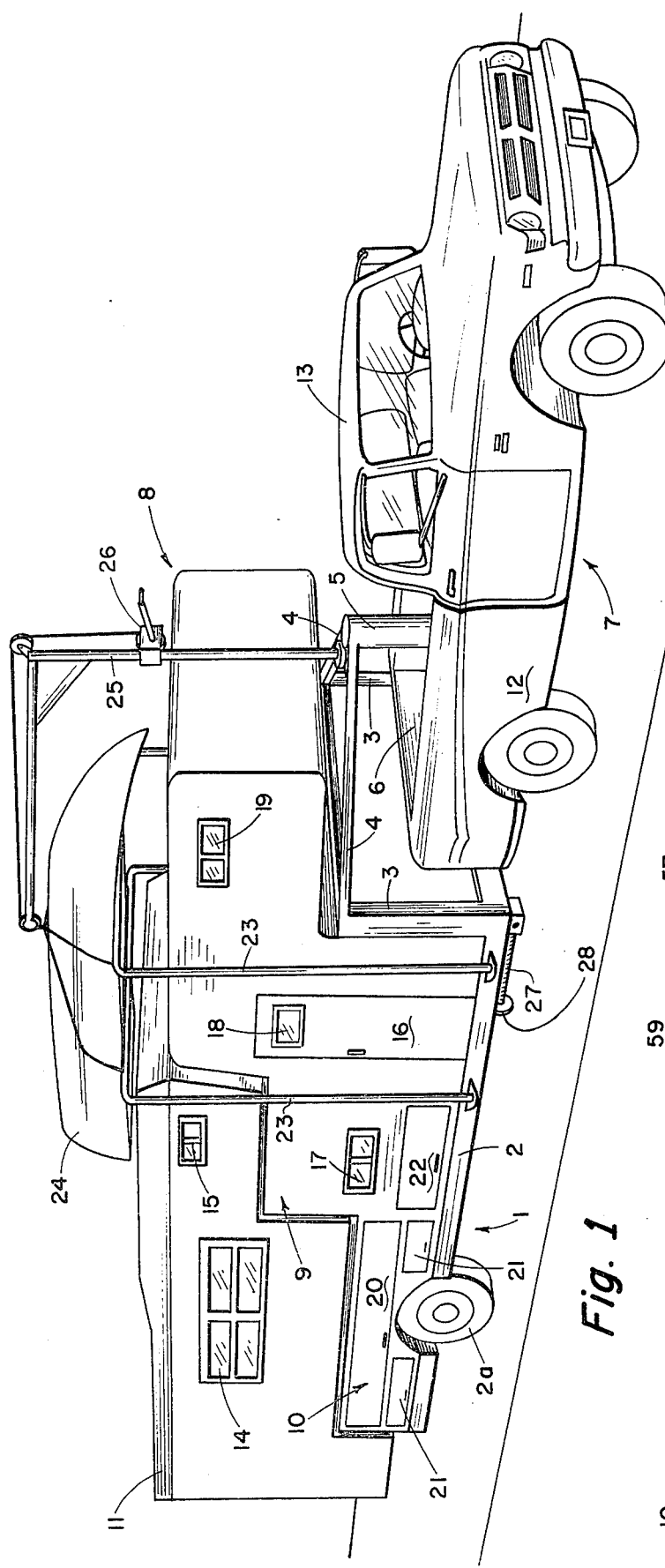
FIG. 1 is a perspective view of the right side of a towable trailer having a first modular camper body thereon that is constructed in accordance with the present disclosure, and a second modular body thereon, located rearwardly of the first, which was designed for hauling on the bed of a pickup truck.

As shown in FIG. 1, a trailer represented at 1 comprises a main frame 2, wheels 2a toward each side thereof, stanchions 3 at the front end thereof, and yoke members 4 which extend forwardly to a towing hitch 5 which connects to a fifth wheel (not shown) that is attached to the bed of the cargo space 6 of a pickup truck 7. A first modular camper body that is constructed in accordance with the present disclosure is generally represented at 8, and rests on the frame 1 toward the forward end thereof. A second modular camper body that is designed and built to normally be carried in the cargo space 6 of the pickup truck is represented at 11, and rests on the frame 1 rearwardly of the camper body 8.

As can be seen in FIG. 1, camper body 8 has outwardly projecting compartments 9 and 10 which extend rearwardly and fit into recesses on the outside of the other camper body 11, the latter being built with such recesses so that it will fit into the bed 6 of the truck 7 and extend outward from the sides 12 thereof and forwardly over the cab 13. When the modular camper bodies are arranged end-to-end on the trailer as shown practically all of the space above the trailer frame 1 that can be enclosed to a reasonable height for a camper vehicle is enclosed by compartments 9 and 10, i.e., since camper body 8 is designed so that compartments 9 and 10 fill the outer recesses of body 11, there is little if any space between the two bodies. To additional advantage, most of the cargo space 6 of the truck remains available for hauling camping equipment and supplies.

Camper body 11 has a door (not shown) at the rear end through which occupants leave and enter, as well as windows 14 and 15. Compartment 9 of camper body 8 has a door 16 through which occupants leave and enter, and also windows 17, 18, and 19 which provide light and ventilation. Compartment 10 and a portion of compartment 9 enclose space which can be used for hauling cargo or storage. This space is accessable through doors 20, 21, and 22 in the sides of the compartments. The trailer frame can also be provided with arches 23, which extend up and over one or both of the camper bodies for supporting a boat 24, as shown, or a platform on which other supplies and/or cargo can be carried. A boom 25 having a wench 26 thereon can be pivotally mounted at its lower end to yoke members 4, and can be used to hoist the boat or cargo. Jackscrews 27 having shoes 28 at their lower ends are mounted on the stanchions 3 of the frame 1, and are run out until they contact the ground when the trailer is disconnected from the pickup truck. Accordingly, the truck can be easily connected to the trailer and disconnected therefrom in order to convert it, back and forth, from a tractor for the trailer to a general utility vehicle.

Figure 3:
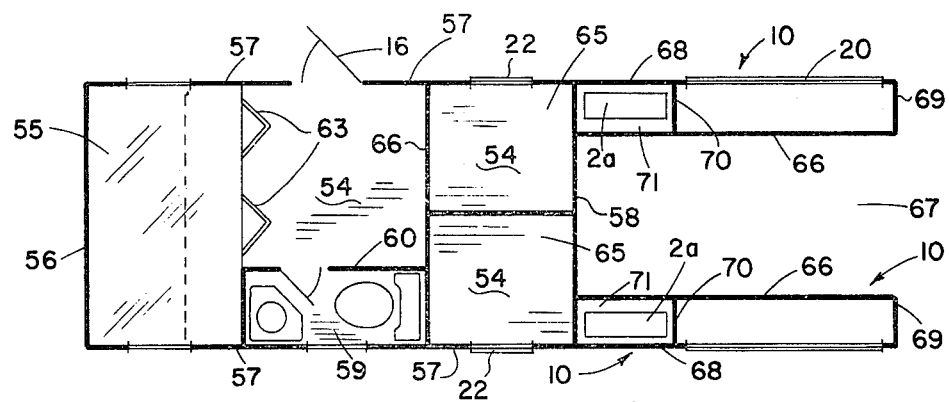
FIG. 3 is a plan view of the first, forwardly located camper body of FIG. 1, but taken at a lower elevation than is shown in FIG. 2.
Figure 4:
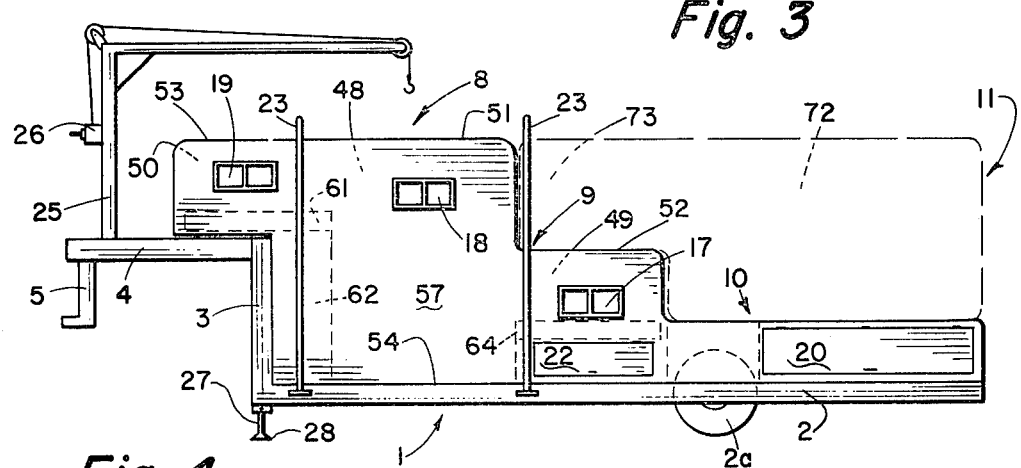
FIG. 4 is an elevational view of the left side of the trailer and the modular camping bodies of FIG. 1.
Figure 6:
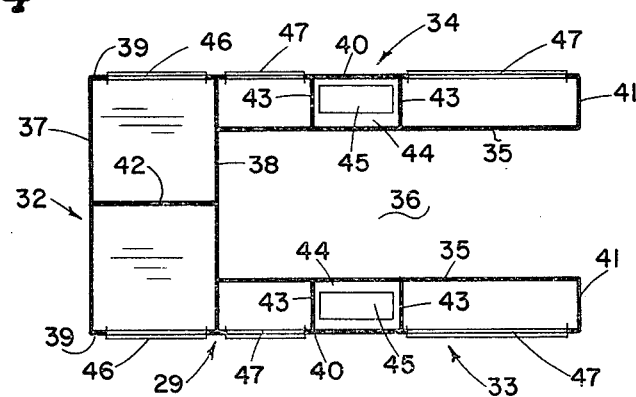
FIG. 6 is a plan view showing a typical layout of the first, forwardly located camper body of FIG. 5.
Figure 5:
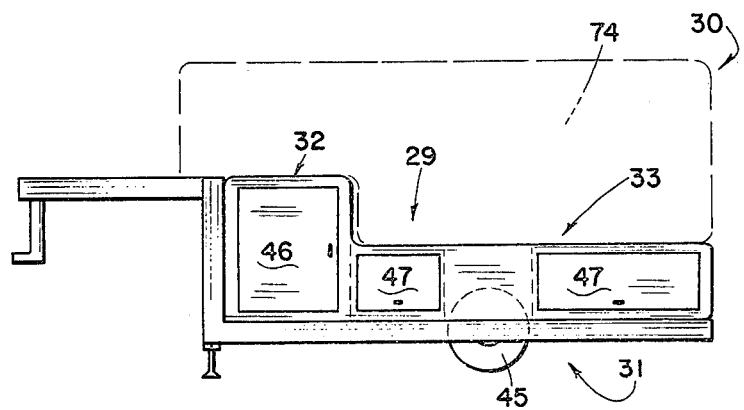
FIG. 5 is a side elevational view of a towable trailer having another first modular camping body thereon that is constructed in accordance with the present disclosure, and a second modular camper body thereon, located rearwardly of the first, which was designed and built for hauling on the bed of a pickup truck.

FIGS. 5 and 6 represent an embodiment of the invention that is somewhat different from that shown in FIGS. 1-4. A first modular camper body constructed in accordance with the present disclosure is represented at 29, whereas a second modular camper body that is designed and built to normally be carried on the bed of a pickup truck is represented by broken lines 30. Both the camper bodies 29 and 30 rest on a trailer, represented at 31, which is shorter but otherwise substantially the same as that shown in FIGS. 1 and 4.

Camper body 29 comprises a forward compartment 32 which is laterally elongated, as well as second and third compartments 33 and 34, respectively, which project rearwardly from the forward compartment 32, and each of which has external height and width dimensions less than those of the forward compartment 32. Where preferred, only one of the rearwardly extending compartments need be included, but two can be employed to advantage for filling the recesses along each side of the camper body 30. Each of the compartments 33 and 34 has an upright inner boundary wall 35 which extends along the length of the compartments, and these walls lie to either side of an open, unobstructed space 36 which becomes filled when camper body 30 is placed over camper body 29 as shown. The terms forward, rearward, side, lateral, and derivatives thereof are used herein are intended to define a directional orientation with reference to the manner that components would normally be oriented on a trailer during the towing thereof.

Each compartment 32, 33, and 34 contains utilizable space, and the term "utilizable space" as used herein is intended to mean enclosed space in a camper body that is accessable and usable by persons during a camping activity. Camper body 29 thus comprises a forward compartment 32 which is taller and wider, both inside and outside, than the rear compartments 33 and 34, and forward compartment 32 thus has an upper elevational limit of utilizable space which is higher than those of the rear compartments.

Referring specifically to FIG. 6, the forward compartment 32 has a front boundary wall 37, a rear boundary wall 38 and side boundary walls 39, whereas compartments 33 and 34 each have an outer boundary wall 40 and an end boundary wall 41 in addition to the inner boundary wall 35. All of the boundary walls are upright walls, and each stems from a floor (not shown) of the respective compartments and terminates at a ceiling (not shown) therefor.

Elaborate details and specifications of building methods and materials of construction are deemed unnecessary in this disclosure since conventional methods and materials can be used, but certain advantageous arrangements of the compartments and their boundary walls will nonetheless be pointed out. It is preferred, for instance, that the boundary walls 35 be substantially parallel to each other and spaced apart at a distance which corresponds to the internal width dimension of the cargo space 6 of a pickup truck or, more particularly, to the external width dimension of the lower part of camper body 30 in order that compartments 33 and 34 fill the recesses along the sides thereof. In like fashion, it is preferred that forward compartment 32 have external height and width dimensions that permit it to fill the forward recess in camper body 30 which previously existed for the purpose of allowing the front end of the body to extend over the cab of a pickup truck.

Since the external recesses in the side of camper body 30 are at right angles to the front recess, it is preferred that the inner boundary walls 35 of the rear compartments 33 and 34 be at a right angle to the rear boundary wall 38 of forward compartment 32, and it is also preferred that the outer boundary walls 40 of the rear compartments 33 and 34 be parallel to each other.

Camper body 29 of FIGS. 5 and 6 comprises utilizable space in compartments 32, 33 and 34 that is intended primarily for hauling and/or storage of equipment and supplies. Forward compartment 32, as shown, has a partition wall 42 that divides it into two halves, whereas rear compartments 33 and 34 have partition walls 43 which extend from the inner to the outer boundary walls thereof. The use of such partitions is optional, as is the use of more or fewer than shown, the presence and number of such being dictated by the materials used, as well as the loads and conditions of use that the camper body must be able to withstand. As shown in FIGS. 5 and 6, the partition walls 43 in rear compartment 33 and 34 have been emplaced at each end of a wheel well 44 for wheels 45 of the trailer 31. The wheel wells serve as guards whereby the splashing of rain and mud onto the trailer, and behind it, is alleviated. Doors 46 and 47 provide access to the forward compartments 32 and 33 and 34 respectively. Where preferred, compartment 32 can be made into a sleeping compartment by removing partition 42 and installing a bed and one or more windows or other suitable ventilators. Compartment 32 can also be adapted for use as a cage for pets or hunting dogs.

Referring again to FIGS. 1-4, the camper body 8 comprises a forward compartment 9 that is sectionalized in that it has 3 sections of utilizable interior space therein which are generally represented at 48, 49 and 50. A first section 48 is located forwardly of a second section 49, and the first section has an upper elevational limit of utilizable space, e.g., ceiling 51, which is higher than that of the second section 49 at its ceiling 52. The interior utilizable space of the first section 48 is accessible from the second section 49, and vice versa.

A third section of utilizable space 50 can be provided in forward compartment 9, and can be located forwardly of the first section 48 and provided with an upper elevational limit of utilizable space, e.g., ceiling 53, which is higher than that of the second section 49. In addition, it is also preferred that the second section 49 and the third section 50 both be accessible from the first section 48, and vice versa. In accordance with the drawings, the first and second sections 48 and 49 of compartment 9 have a common floor 54, whereas the third section 50 has its own floor 55 located at a higher level. The third section 50 can, therefore, be provided with upper and lower elevational limits of utilizable space higher than those of the second section 49, i.e., both the ceiling and the floor of the third section are at a higher elevational level than the ceiling and floor of the second section.

Figure 2:
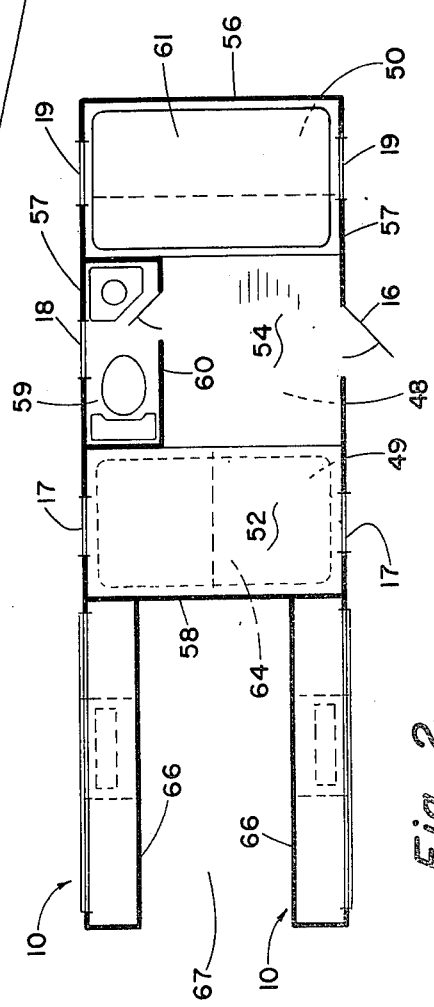
FIG. 2 is a plan view showing a typical layout of the first, forwardly located camper body of FIG. 1.

The forward compartment 9 of the camper body 8 has a front boundary wall 56, side boundary walls 57 and a rear boundary wall 58. As shown in FIGS. 2-4, first section 48 of compartment 9 is a living space for sitting, dressing, etc., and has a bathroom 59 between partition wall 60 and side boundary wall 57. The third section 50 is a sleeping-storage space, being provided with a bed 61 and a closet 62 which has folding doors 63. The second section 49 is also a sleeping-storage space, a bed 64 being located over storage spaces 65 to which access is gained from the outside through doors 22. Living space 48 has a door 16 through which persons enter and leave the camper compartment 9, and the three sections 48, 49 and 50 are provided with windows 17, 18 and 19. It will be understood that FIGS. 1-4 represent only one representative embodiment of the manner in which the space in compartment 9 can be utilized. Bathroom 59, for instance, is optional and the space therein can be utilized for other purposes, if desired, e.g., for galley space. Additionally, the second and/or the third spaces can be used for storage or otherwise utilized in some suitable fashion other than has been shown and described herein.

Camper body 8 can, to advantage, be provided with second and third compartments 10 which extend rearwardly from the sectionalized forward compartment 9, and each of the second and third compartments can have an upright inner boundary wall 66, and these walls can be spaced apart from each other laterally to provide an open, unobstructed space 67 into which the camper body 11 fits when placed on top of camper body 8. Second and third compartments 10 also have outer boundary walls 68, end walls 69, partitions 70, wheel wells 71 for wheels 2a, and doors 20 which provide access into the compartments from the outside. It will also be understood that compartments 10 can have constructional features as were indicated as being preferrable and advantageous for compartments 33 of camper body 29 of FIGS. 5 and 6.

A camping trailer can be assembled by mounting a camper body such as 8 or 29 on a horizontally disposed main frame having a towing hitch at the front end and wheels mounted thereon toward each side. Advantageously, a second camper body such as 11 or 30 can then be placed end-to-end of body 8 or 29 to provide a camping trailer with two bodies thereon, each having doors for entry and exit, and whereby substantially more utilizable space is at hand than would be available from use of the body 11 or 30 alone.

Referring specifically to the camping trailer shown in FIGS. 1-4, the previously described camper body 8 is located on trailer 1 forwardly of the second camper body 11, and the second body is sectionalized in that it has first and second sections of utilizable interior space, which are represented at 72 and 73 respectively. The first section 72 of the second body 11 is located rearwardly of the second section 73, and the first section has a lower elevational limit of utilizable space near the vicinity of the ceiling 52 of compartment 9 of camper body 8. The first section 72 of utilizable space in camper body 11 thus extends to a lower level than that of the second section 73. As a consequence, the second section 49 of camper body 8 can thus fit beneath and reside under the second section 73 of camper body 11, thereby providing enclosed, utilizable space that would otherwise be left open and vacant. As can also be seen, the cargo-storage compartments 10 fill the recess along the sides of body 11 to provide additional utilizable space.

In FIGS. 5 and 6, the second camper body 30 has been placed over the first body 29 so that a rearward portion 74 of the second body resides rearwardly of the forward compartment 32 of the first body and also between the second and third compartments 33 and 34. The second camper body 30 thus overlaps the first camper body 29, and in the illustrated case compartments 32, 33 and 34 are each fully overlapped by the second camper body.

A new and very useful camper arrangement whereby the previously stated objects can be achieved has now been described in detail. Trailers of a sufficient length to provide camper arrangements as shown in FIGS. 1-4 and 5-6 can be purchased on the open market. Arches 23 and boom 25 are optional features that can be added if desired. With the arrangement shown in FIGS. 1-4, there is no passageway between the two camper bodies, and although such can be provided, greater privacy is available in its absence.

In describing the relationship of the modular camper bodies to each other, or the relationship of their various components and parts, the terms "forward" or "rearward," or "front" or "rear" have been frequently used herein, but it will be understood that these terms have been used merely for the purpose of explanation, since equivalent arrangements whereby the relationship of the camper bodies or the components is reversed are within the scope of the present invention. Furthermore, the invention has also been described with reference to particular components, arrangements, layouts, alignments, relationships, orientations, and the like, and it will nonetheless be understood that even other embodiments will become apparent which are within the spirit and scope of the invention defined in the following claims.

What is claimed and desired to secure by Letters Patent is:

1. A modular camper body comprising:
    (a) a forward compartment having a floor, boundary walls and a ceiling which enclose living space for activity by a camping person residing in an upright position on said floor;
    (b) second and third compartments which extend rearwardly from said forward compartment and lie to either side of an unenclosed median space;
    (c) said modular camper body being adapted to engage with an overlying camper body in a fitted relationship with at least a portion of said forward compartment of said modular camping body residing forwardly of said overlying camper body; and
    (d) said overlying camper body includes a front recess and side recesses, and a portion of said forward compartment is adapted to fit into said front recess and said second and third compartments are adapted to fit into said side recesses.

2. A modular camper body as in claim 1 wherein said forward compartment is sectionalized and has first and second sections, said first section having an upper elevational limit of utilizable space therein which is higher than that of said second section, said second section being adapted to fit in said front recess of an overlying camper body while said first section resides forwardly thereof.

3. A modular camper body having compartments that engage front and side recesses of an overlying camper body when the two bodies are placed end-to-end, said modular camper body comprising, in combination:
    a. a forward compartment having first and second sections of utilizable space therein, said first section being located forwardly of said second section and having an upper elevational limit of utilizable space higher than that in the second,
    b. second and third compartments which extend rearwardly from each end of said forward compartment and which have an upper elevational limit of utilizable space which is lower than that in the second section of said forward compartment, and
    c. wherein said second section of the forward compartment and said second and third compartments of said modular camping body are adapted to closely fit into the front and side recesses of an overlying camper body with extension of said first section forwardly of the front recess therein.

4. A modular camper body as in claim 3 wherein said first compartment comprises a floor, boundary walls and a ceiling which enclose a living space for activity by a camping person in an upright position on said floor.

5. A modular camper body as in claim 3 wherein said forward compartment further comprises a third section of utilizable space located forwardly of said first section, the upper elevational limit of utilizable space in said third section being higher than that in said second section.

6. A camper arrangement comprising, in combination:
    a. a horizontally disposed main frame having wheels mounted thereon toward each side,
    b. a first camper body mounted on said frame, said first camper body having a sectionalized compartment with first and second sections of utilizable interior space therein, said first section being located forwardly of said second section and having an upper elevational limit of utilizable space at a higher level than that of said second section, the interior space of each of said sections being accessible from the other section, and
    c. a second camper body mounted on said frame behind said first camper body, said second camper body having a sectionalized compartment with first and second sections of utilizable interior space therein, said first section of the second body being located rearwardly of said second section thereof and having a lower elevational limit of utilizable space at a lower level than that of the second section, and wherein said second section of the first camper body resides beneath said second section of the second camper body.

7. A camper arrangement as in claim 6 wherein said sectionalized compartment of the first camper body comprises a third section of utilizable space, said third section being located forwardly of said first section of the first camper body, and wherein the upper and the lower limits of utilizable space in said third section are above those of said second section of the first said body.

8. A camper arrangement comprising, in combination:
    a. a horizontally disposed main frame having wheels mounted thereon toward each side,
    b. a first camper body having a forward compartment, second and third compartments which extend rearwardly from each end of said forward compartment, each of said second and third compartments having an upright boundary wall, said boundary walls being spaced apart from each other laterally,
    c. a second camper body of which at least a portion thereof resides rearwardly of said forward compartment of said first camper body and between said second and third compartments thereof, and
    d. wherein the second camper body overlaps said forward, second and third compartments of said first body.

9. A camper arrangement comprising, in combination, first and second modular camping bodies which fit together end-to-end, said first camper body having forward, second and third compartments, said forward compartment including first and second sections therein and said second and third compartments extending rearwardly from said forward compartment, said first section being located forwardly of said second section and having an upper elevational limit of utilizable space greater than said second section, said second camper body having a front recess, side recesses, and a compartment with a front section that extends over said front recess and a rear section having a lower portion that lies between said side recesses, and wherein said second section of the first body resides within said front recess of the second body, said second and third compartments of the first body reside within said side recesses of the second body, and said first section of the forward compartment is located forwardly of said front recess.

10. A camper arrangement as in claim 9 wherein the upper limit of utilizable space in said first section of the forward compartment of said first body is at a higher level than said second section therein.

11. A camper arrangement as in claim 9 wherein said forward compartment encloses a living space for activity by a camping person in an upright position and second and third compartments are storage compartments.

* * * * *